United States Patent [19]

Kessler

[11] Patent Number: 5,742,973
[45] Date of Patent: Apr. 28, 1998

[54] WIPER APPARATUS FOR A WINDOW OF A MOTOR VEHICLE

[75] Inventor: Peter Kessler, Sasbach, Germany

[73] Assignee: Robert Bosch GmbH, Stuttgart, Germany

[21] Appl. No.: 700,465

[22] PCT Filed: Feb. 17, 1995

[86] PCT No.: PCT/DE95/00198

§ 371 Date: Aug. 14, 1996

§ 102(e) Date: Aug. 14, 1996

[87] PCT Pub. No.: WO95/23713

PCT Pub. Date: Sep. 8, 1995

[30] Foreign Application Priority Data

Mar. 3, 1994 [DE] Germany ............... 44 07 050.0

[51] Int. Cl.$^6$ .............................................. B60S 1/38
[52] U.S. Cl. ............................. 15/250.46; 15/250.44
[58] Field of Search ...................... 15/250.46, 250.44, 15/250.31, 250.361, 250.41, 250.4, 250.48, 250.47, 250.43

[56] References Cited

U.S. PATENT DOCUMENTS

| | | | |
|---|---|---|---|
| 4,418,441 | 12/1983 | van den Berg | 15/250.46 |
| 4,896,987 | 1/1990 | Pethers | 15/250.46 |
| 5,073,060 | 12/1991 | Pethers | 15/250.46 |
| 5,090,086 | 2/1992 | Journee et al. | 15/250.46 |
| 5,183,352 | 2/1993 | Carpenter | 15/250.46 |

FOREIGN PATENT DOCUMENTS

| | | | |
|---|---|---|---|
| 2630070 | 10/1989 | France | 15/250.46 |
| 1183446 | 3/1970 | United Kingdom | 15/250.46 |
| 2041730 | 9/1980 | United Kingdom | 15/250.46 |
| 2186910 | 8/1987 | United Kingdom | 15/250.46 |

*Primary Examiner*—Gary K. Graham
*Attorney, Agent, or Firm*—Michael J. Striker

[57] ABSTRACT

A wiper apparatus has a wiper blade which has a multi-linked frame on which a wiping element placed on the windshield is held and wherein the frame has an upper bow of an essentially U-shaped cross section, on at least one end of which a lower bow, which dips between the U-shaped legs, is hinged in the manner of a balance arm, and wherein an elastically deformable hinge element, which can be locked with the upper bow and is U-shaped at least in the installed state, is disposed between the surfaces of the upper and lower bows facing each other, and extends with hinge protrusions disposed on the insides of its U-shaped legs and oriented toward each other into bearing recesses of the lower bow. A particularly simple and low-cost assembly is achieved, if the upper bow has at least one opening in the area of its U-shaped base, through which a detent element connected with the hinge element lockingly extends while being elastically deflected in respect to the upper bow.

5 Claims, 1 Drawing Sheet

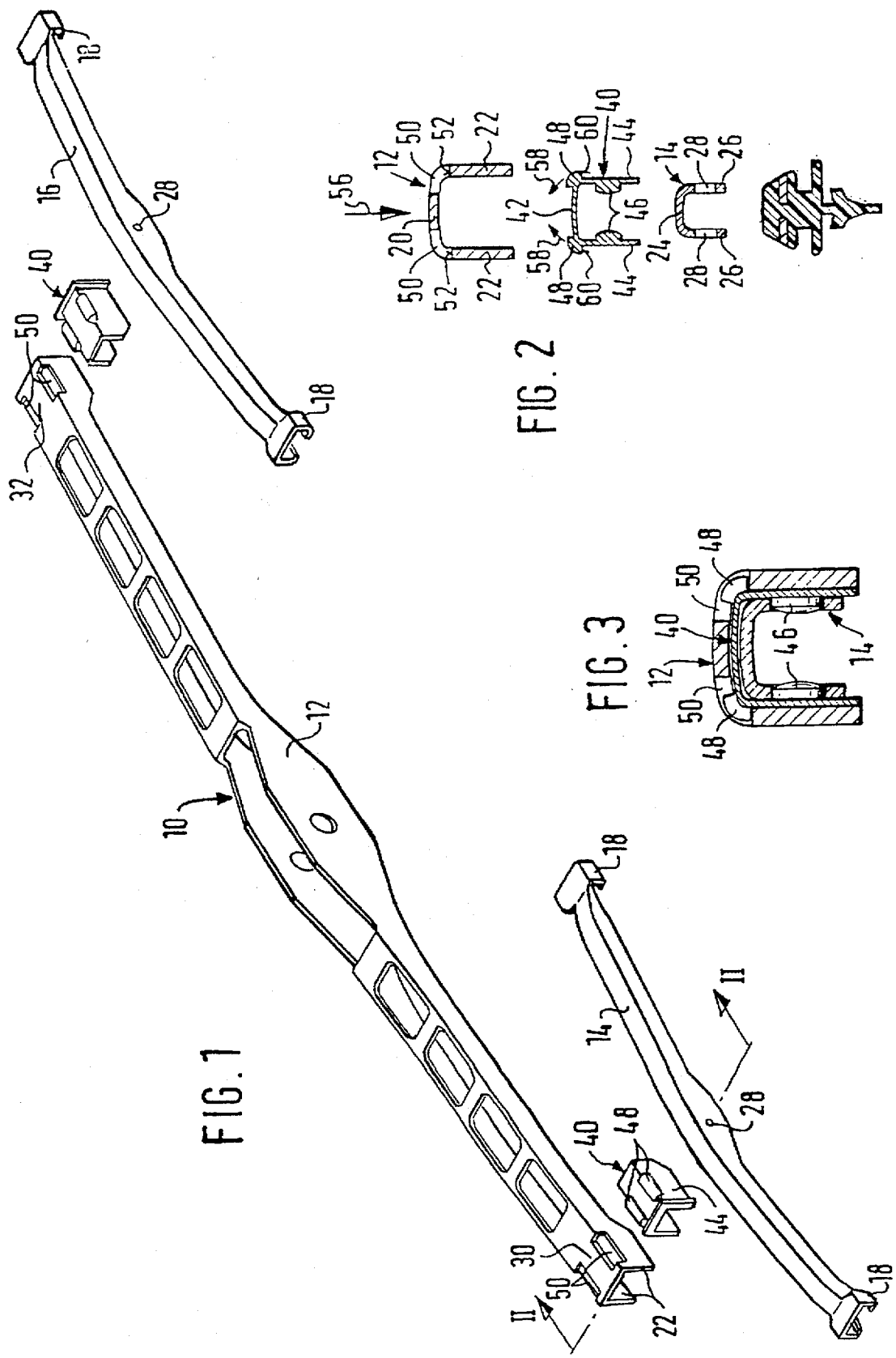

WIPER APPARATUS FOR A WINDOW OF A MOTOR VEHICLE

BACKGROUND OF THE INVENTION

The invention relates to a wiping apparatus in accordance with the species of the main claim. A wiping apparatus is already known (DE-OS 40 32 428), wherein detent hooks are disposed on the free ends of the U-shaped legs of the hinge element, which extend behind the free end of the U-shaped leg of the upper bow, so that the hinge element is fixedly connected with the upper bow. The upper bow is subsequently pressed over the lower bow, wherein the hinge protrusions must be inserted over the lower bow, which is resilient over its width, until the hinge protrusions reach the seating recesses of the lower bow. But there is the danger that the lower bow becomes permanently deformed in the course of this, for which reason the lower bow must again be pushed apart for a secure seating of the two bows against each other.

SUMMARY OF THE INVENTION

Accordingly, it is an object of the present invention to provide a wiper apparatus which avoids the disadvantages of the prior art.

The wiping apparatus in accordance with the invention has the advantage that the detent element alone is elastically deflected in the course of the assembly of the two bows on each other. The deformation of the bows is avoided by this and adjustment work is omitted.

BRIEF DESCRIPTION OF THE DRAWINGS

An exemplary embodiment of the invention is represented in the drawings and explained in detail in the following description. FIG. 1 shows the support frame, which is part of a wiper blade of a wiping apparatus for windshields of motor vehicles, in an exploded view, FIG. 2 shows a section through the frame elements along the line II—II in FIG. 2 in an enlarged view, and FIG. 3 shows the support frame elements of FIG. 2 in the assembled state, represented enlarged.

DESCRIPTION OF THE PREFERRED EMBODIMENTS

An upper bow 12, hereinafter identified as the main bow, and two lower bows 14 and 16, hereinafter identified as claw bows, are parts of a support frame 10 represented in FIG. 1. On their ends, the two claw bows 14 and 16 have claw-like protrusions 18, which are used for grasping a wiper strip, not shown, resting on the windshield to be wiped. The claw bows 14 and 16 are hinged in the manner of a balance arm at the two ends of the main bow 12 and essentially have a U-shaped cross section (FIG. 2). The main bow 12 thus has a U-shaped base 20 which makes a transition into the two U-shaped legs 22 which are parallel with each other. The U-shaped base 24 of the claw bows 14 and 16 is also provided with U-shaped legs 26. The two U-shaped legs 26 of the claw bows 14 and 16 furthermore have respectively one seating recess 28 in their center area. The seating recesses 28 of the U-shaped legs are aligned with each other.

The support bow frame 10 has hinge elements 40, preferably made of an elastically deformable plastic material and also made U-shaped in cross section (FIG. 2), for the hinged fastening of the claw bows 14 and 16 on the two ends 30 and 32 of the main bow 12. In this case a hinge element 40 is associated with each end 30, 32 of the main bow 12. Since the two hinge element 40 are formed in exactly the same way and are also mounted in the same way, only the embodiment of the hinge element 40 associated with the end 30 will be explained in what follows. The U-shaped hinge element 40 has a U-shaped base 42, on which the two U-shaped legs 44 are connected. Each one of the two U-shaped legs 44 is provided with a pin-like hinge protrusion 46, whose diameters are matched to the diameters of the seating recesses 28 in the U-shaped legs 26 of the claw bow 14. In addition, strip-like, elastically deflectable detent elements 48 extending in the longitudinal direction of the elongated support frame 10, are disposed in the transition area of the U-shaped legs 44 and the U-shaped base 42 on the hinge element 40, to which slit-like openings 50 in the main bow 12 are assigned. The slit-like openings 50 are located in the transition area between the U-shaped base 20 and the U-shaped legs 22. As can be seen from FIG. 2 in particular, the slit-shaped openings 50 extend from the U-shaped base 20 as far as the U-shaped legs 22, so that delimiting edges 52 result on the U-shaped legs.

The assembly of the claw bows 14, 16 on the main bow 12 will be described in detail by means of FIG. 2. First, the hinge element 40 is pushed over the claw bows 14 in the direction of the arrow 56, while its U-shaped legs 44 are deflected in such a way that the seating pins 46 disposed on the inner sides of the U-shaped legs 44 of the hinge element 40 enter the seating recesses 28 of the claw bow 14 to which they are assigned. Now the main bow 12 is also pushed in the direction of the arrow 56 over the claw bow 14 provided with the hinge element 40. However, in the course of this only the two detent elements 48 of the leg element 40 are deflected in the direction of the arrows 58, so that they slide along the inner sides of the U-shaped legs 22 of the main bow 12 until they reach the area of the slit-like openings 50. Then the detent elements 48 spring back again into their initial position shown in FIG. 2, wherein detent faces 60 disposed on the detent element 48, cooperating with the delimiting edges 52 of the slit-shaped openings 50, result in an engagement between the main bow 12 and the claw bow 14. Thus, the delimiting edges 52 constitute counter-detent means for the detent elements 48, which extend from the hinge elements and have a concave outer surface extending along the slit. The hinge element 40 is now connected fixedly and secure against rotation with the main bow 12. The claw bow 14, however, is suspended, movable in the manner of a balance arm, in respect to the main bow, because the seating bores 28 in the U-shaped legs 26 of the claw bow 14 allow an oscillating movement of the claw bow 14 in respect to the hinge pin 46 (FIG. 3). In this case the effective height of the detent element 48 is of such size that it is not greater than the thickness of the material of the upper bow. This is intended to prevent the projection of the detent elements 48 past the outer contour of the main bow 12 and thus the unintentional release of the locked connection between the main bow 12 and the claw bow 14 or of the hinge element 40, which is hingedly connected with the claw bow.

I claim:

1. A wiping apparatus for a windshield of motor vehicles, comprising a wiper blade having a multi-linked frame with an elongated upper bow of substantially U-shaped transverse cross-section defining a base interconnecting two legs, said frame also including elongated lower bows, each having bearing recesses therein, a wiping element placeable on the windshield and held by said lower bows, elastically deformable elongated hinge elements secured to opposite ends of said upper bow and dipping between said legs, said hinge elements being lockable within said upper bow and being U-shaped in transverse cross-section and also disposed between surfaces of said upper and lower bows facing each other, said hinge elements having inner hinge protrusions engaging said bearing recesses of said lower bows, respectively, said upper bow having a pair of openings in said base at each end located between said base and said legs, a pair of detent elements extending from each said hinge element and lockingly engaging through said pair of openings, respectively, in said base of said upper bow, said openings in said base extending to said legs so that limiting edges are formed on said legs to form counter-detent means for said detent elements, said detent elements extending from said hinge elements and having an outer surface extending in a longitudinal direction of said hinge element and said bows.

2. A wiping apparatus as defined in claim 1, wherein said outer surface of said detent elements is concave.

3. A wiping apparatus as defined in claim 1, wherein said openings extend in a longitudinal direction of said upper bow.

4. A wiping apparatus as defined in claim 1, wherein said detent elements are strip-shaped and extend in a longitudinal direction of said upper bow.

5. A wiping apparatus as defined in claim 1, wherein said detent elements have an effective locking height which corresponds to a thickness of a material of said upper bow.

* * * * *